Patented Aug. 26, 1941

2,253,773

UNITED STATES PATENT OFFICE 2,253,773

TREATING, ESPECIALLY SOFTENING, CELLULOSIC TEXTILE MATERIALS

Kurt Engel, St. Louis, Haut-Rhin, France, and Kurt Pfaehler, Basel, Switzerland, assignors to the firm J. R. Geigy A. G., Basel, Switzerland No Drawing. Application April 14, 1938, Serial No. 202,138. In Switzerland April 20, 1937

6 Claims. (Cl. 28—1)

This invention relates to the treatment of textile materials and is especially concerned with the softening thereof and has particular reference to the use of urea derivatives.

It has been found that water soluble urea derivatives containing quaternary amino groups, of specific constitution, are suitable in a notable way for improving, and especially for softening, textile materials and like manufacture.

According to this invention at least one of the four hydrogen-atoms in the urea is replaced by a residue of an organic amine with at least one quaternary N-atom (in the form of a water soluble salt), the residue of the amine preferably also containing a cyclic atom group, and at least one further hydrogen atom being replaced by a higher molecular organic residue with at least six C-atoms, whilst this residue can be interrupted by bi-valent hetero atoms or hetero atom groups. The remaining valencies of the two nitrogen atoms can be satisfied by hydrogen, aliphatic or other appropriate organic residues which can also be interrupted by bi-valent hetero atoms or hetero atom groups.

The higher molecular organic residue with at least six C-atoms occupying one of the valencies of the 2 nitro atoms may for example be a hexyl-, octyl-, undecyl-, dodecyl-, tetradecyl-, heptadecyl-, heptadecenyl-, octodecyl-, octodecenyl-, C-substituted cyclopentyl-, substituted cyclohexyl-residue.

These compounds, which in part are new, can be produced easily by usual processes, see for example Berichte 44, page 370 (1911), or 50, page 1046 (1917), where two methods for the manufacture of

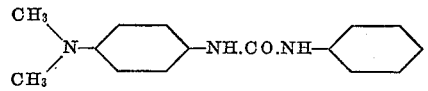

namely from p-amino-dimethylaniline and phenylisocyanate or from p-dimethylaminophenylisocyanate and aniline are disclosed.

For example higher molecular alkyl amines may be converted with phosgene into the corresponding alkyl carbamic acid chlorides and these compounds may be treated with polyamines, which in addition to tertiary or quaternary amino groups also contain primary and secondary amino groups with exchangeable hydrogen; for example heptadecyl amine is allowed to react with phosgene to form the corresponding carbamic acid chloride and this compound is condensed with p-aminodimethyl aniline, whereby N-p-dimethyl-amino-phenyl-N'-heptadecyl urea is obtained, which is rendered water soluble by means of alkylating agents like suitable esters of low molecular alcohols.

Or high molecular iso-cyanates, which for example may be produced according to the method described in French specification 809,233, may be treated with polyamines as indicated above. If for example the as-dimethyl ethylene diamine is allowed to act on undecyl-cyanate, there is formed N - dimethyl - amino - ethyl - N'-undecyl urea, which by further treatment with dimethyl sulphate, benzyl chloride, ethyl bromide or other alkylating or aralkylating agents can be converted into the quaternary compound.

Another method of producing these bodies consists in treating high molecular carbamic acid esters with primary or secondary amines, according to the known method for treating ordinary carbamic acid ester with ammonia. This process is carried out, for example, by heating together to 250° C. equimolecular quantities of heptadecyl carbamic acid methyl ester and p-aminodimethyl aniline. Thus there is obtained the N-p-dimethyl-amino-phenyl-N'-heptadecyl urea, which as indicated above can be converted into the quaternary compound.

The water soluble urea derivatives thus produced constitute valuable assistants for the textile industry, particularly for softening artificial silk according to the impregnation process.

Example

A solution is prepared from 0.4 g. of N-p-dimethylaminophenyl-N'-heptadecyl urea, which has been converted with dimethyl sulphate into the quaternary base, in 1,000 g. of distilled water, to which there are added 2.4 g. of calcinated sodium sulphate and with this solution there is treated for 10 minutes at a temperature of 40–45° C. a skein of viscose artificial silk of a weight of 40 g. (proportion of the treating bath 1:25). Thereupon by squeezing and centrifuging the excess of liquid is removed and without rinsing drying takes place at a moderate heat. The cold artificial silk has a very soft feel.

Instead of the quaternary compound used in the above example there may be used those derived for example from the following urea derivatives: N - diethyl - amino - ethyl - N-methyl-N'-octodecyl urea, N-p-dimethyl-amino-phenyl-N'-heptadecyl urea, N-p-diethyl-amino-phenyl-N'-ethyl - N' - octodecyl urea, N-dimethyl - aminophenyl-N'-undecyl urea, N-pyridyl-N'-heptadecyl urea, N-pyridyl-N'-heptadecenyl urea, N-pyridyl-N'-undecyl urea, N-thiazolyl-N'-heptadecyl urea, N-thiazolyl-N'-heptadecenyl urea, N-dimethyl-amino-ethyl-N'-cyclohexyl urea, N-dimethyl-amino-benzyl-N'-dodecyl urea, N-m-dimethyl-amino-phenyl-N-methyl-N'-ethyl - N'-tetradecyl urea, N-dimethyl-amino-ethyl-N'-undecyl urea, N-diethyl-amino-phenyl-N'-octodecyl urea, N-p-diethyl - amino - phenyl - N'-(dodecyl - oxethyl)-urea, N - diethyl - amino - phenyl-N'-stearyl-N'-phenyl urea, N-diethyl-amino-ethyl-N'-stearyl-N'-phenyl urea. These compounds may be converted according to the above indicated methods, for example with suitable esters of low molecular alcohols, as for example: dimethyl and diethyl sulphate, ethyl bromide, methyl iodide, into the quaternary compounds.

What we claim is:

1. A process for softening cellulosic materials, which comprises treating the said cellulosic material with an aqueous bath containing as its essential active ingredient a water-soluble derivative of urea bearing at one nitrogen atom of the said urea molecule a high molecular alkyl radical with at least six carbon atoms and bearing at the other nitrogen atom of the said urea molecule the radical —X.Y wherein X means one of the group consisting of

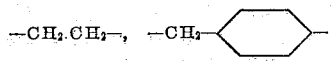

and phenyl and Y means a quaternary nitrogen atom.

2. A process for softening cellulosic materials, which comprises treating the said cellulosic material with an aqueous bath containing as its essential active ingredient a water-soluble derivative of urea bearing at one nitrogen atom of the said urea molecule a high molecular alkyl radical with at least six carbon atoms and bearing at the other nitrogen atom of the said urea molecule the radical —CH$_2$.CH$_2$—Y, wherein Y means a quaternary nitrogen atom.

3. A process for softening cellulosic materials, which comprises treating the said cellulosic material with an aqueous bath containing as its essential active ingredient a water-soluble derivative of urea bearing at one nitrogen atom of the said urea molecule a high molecular alkyl radical with at least six carbon atoms and bearing at the other nitrogen atom of the said urea molecule the radical

wherein Y means a quaternary nitrogen atom.

4. A process for softening cellulosic materials, which comprises treating the said cellulosic material with an aqueous bath containing as its essential active ingredient a water-soluble derivative of urea of the following formula:

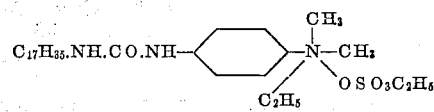

5. A process for softening cellulosic materials, which comprises treating the said cellulosic material with an aqueous bath containing as its essential active ingredient a water-soluble derivative of urea of the following formula:

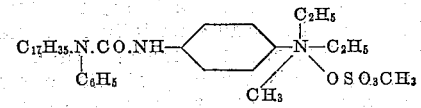

6. A process for softening cellulosic materials, which comprises treating the said cellulosic material with an aqueous bath containing as its essential active ingredient a water-soluble derivative of urea of the following formula:

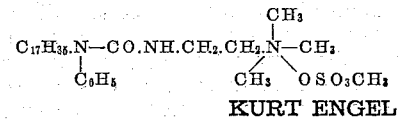

KURT ENGEL.
KURT PFAEHLER.